United States Patent
Neil et al.

(10) Patent No.: US 7,727,429 B2
(45) Date of Patent: Jun. 1, 2010

(54) CORE FOR MOLDING A CERAMIC DISCHARGE VESSEL

(75) Inventors: Jeffrey T. Neil, North Reading, MA (US); Joseph V. Lima, Salem, MA (US); Victor E. Perez, Manchester, MA (US)

(73) Assignee: OSRAM Sylvania Inc., Danvers, MA (US)

( * ) Notice: Subject to any disclaimer, the term of this patent is extended or adjusted under 35 U.S.C. 154(b) by 1468 days.

(21) Appl. No.: 10/907,255

(22) Filed: Mar. 25, 2005

(65) Prior Publication Data

US 2006/0216446 A1  Sep. 28, 2006

(51) Int. Cl.
*B29D 11/00* (2006.01)

(52) U.S. Cl. .......................... 264/2.2; 264/2.3
(58) Field of Classification Search ................. 264/2.2, 264/2.3
See application file for complete search history.

(56) References Cited

U.S. PATENT DOCUMENTS

| | | | | |
|---|---|---|---|---|
| 3,403,037 A | * | 9/1968 | Cowan et al. .............. 106/38.6 |
| 5,972,269 A | | 10/1999 | Barros et al. ............... 264/221 |
| 6,620,272 B2 | | 9/2003 | Zaslavsky et al. .......... 156/73.5 |
| 6,953,503 B2 | * | 10/2005 | Miyazawa et al. ....... 106/287.1 |
| 2003/0190275 A1 | | 10/2003 | Miyazawa et al. |
| 2004/0113557 A1 | | 6/2004 | Scott et al. |

OTHER PUBLICATIONS

Abstract, JP7047518 (1995).

* cited by examiner

*Primary Examiner*—Carlos Lopez
(74) *Attorney, Agent, or Firm*—Robert F. Clark

(57) ABSTRACT

A method of molding a ceramic vessel includes compressing a water-soluble powder, suspending the compressed powder shape in a mold, injecting a ceramic molding mixture into the mold, and dissolving the compressed powder by flushing the vessel with water. A core for making an arc discharge vessel that has a discharge chamber and two capillaries includes a molded core of the water-soluble powder having a shape of the discharge chamber, and preferably two capillary-forming pins extending from the molded core. An apparatus for removing the molded core that includes a water reservoir that preferably flushes water through the vessel and dissolves molded core.

9 Claims, 3 Drawing Sheets

CORE FOR MOLDING A CERAMIC DISCHARGE VESSEL

BACKGROUND OF THE INVENTION

The present invention is directed to the manufacture of ceramic vessels, such as arc discharge vessels for metal halide lamps. As illustrated in FIG. 1, a ceramic vessel 10 for a metal halide lamp has a hollow middle part 12 and may have two hollow capillaries 14 that extend from the middle part. In an arc discharge vessel, the hollow middle part 12 is the arc discharge chamber and the capillaries 14 sealably receive electrodes that extend into the arc discharge chamber. In lamps, the vessel 10 is made of a ceramic material that is transparent or translucent, such as aluminum oxide or aluminum oxynitride.

A common method of molding such vessels has been to form the vessel from several separate parts. For example, a cylindrical central portion may be connected to two capillary end portions by the assembly of three to five individual pieces of ceramic in a process that requires multiple firings.

In lamps, vessel shape is a factor in lamp performance. One improvement is a "bulgy" design that has an elliptical shape, such as two hemispheres separated by a short cylindrical portion. The common method described above is not suitable to make this vessel shape. Bulgy vessels have been made with a two-piece injection molding process in which two half parts are separately molded and then welded together, e.g., as in U.S. Pat. No. 6,620,272 to Zaslavsky et al. While vessels produced with this method are generally acceptable, they have a visible center seam 5 as shown in FIG. 1.

Another known method of molding a one-piece vessel is with a gel casting process that uses a core of a thermoplastic material that is removed by melting. In this method, a fluid suspension is added to the space between an exterior mold and the molded core. The fluid suspension includes a ceramic powder suspended in a liquid medium containing a cross-linking chemical. An activator or catalyst is added to the fluid suspension just prior to filling the mold to initiate the cross-linking process, and the suspension solidifies at completion of the cross-linking. The formed vessel is removed from the exterior mold and then heated to melt the core that drains out of the vessel through an opening in the vessel wall.

A problem with this method has been the residence time needed for the cross-linking to form the vessel, which can vary from several minutes to hours depending on the materials selected. Longer residence times require more molds and more space for high volume production.

SUMMARY OF THE INVENTION

An object of the present invention is to obviate the disadvantages of the prior art.

To this end, the present invention provides a novel method of molding a one-piece hollow ceramic vessel, a molded core and apparatus for molding the vessel, and an apparatus for removal of the core from the molded vessel, in each of which the molded core for defining the hollow chamber of the vessel is a compressed, water-soluble powder that is flushed out of the vessel with water.

A further object of the present invention is to provide a novel method of molding a ceramic vessel that includes the steps of compressing the water-soluble powder, suspending the compressed powder shape in a mold, injecting a ceramic molding mixture into the mold to form the discharge vessel, and dissolving the compressed powder shape by flushing the vessel with water.

A yet further object of the present invention is to provide a novel core for molding an arc discharge vessel that has a discharge chamber and two capillaries, where the core includes a molded core of the water-soluble powder having a shape of the discharge chamber, and two capillary-forming pins extending from the molded core.

Another object of the present invention is to provide a novel apparatus for molding the ceramic vessel that includes an exterior mold containing the compressed powder shape.

These and other objects and advantages of the invention will be apparent to those of skill in the art of the present invention after consideration of the following drawings and description of preferred embodiments.

DETAILED DESCRIPTION OF THE INVENTION

Figure 2:
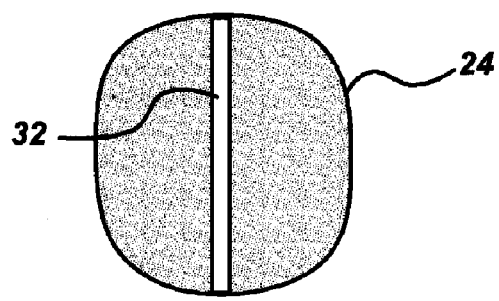
FIG. 2 is cross sectional illustration of a preferred molded core of this invention.
Figure 3:
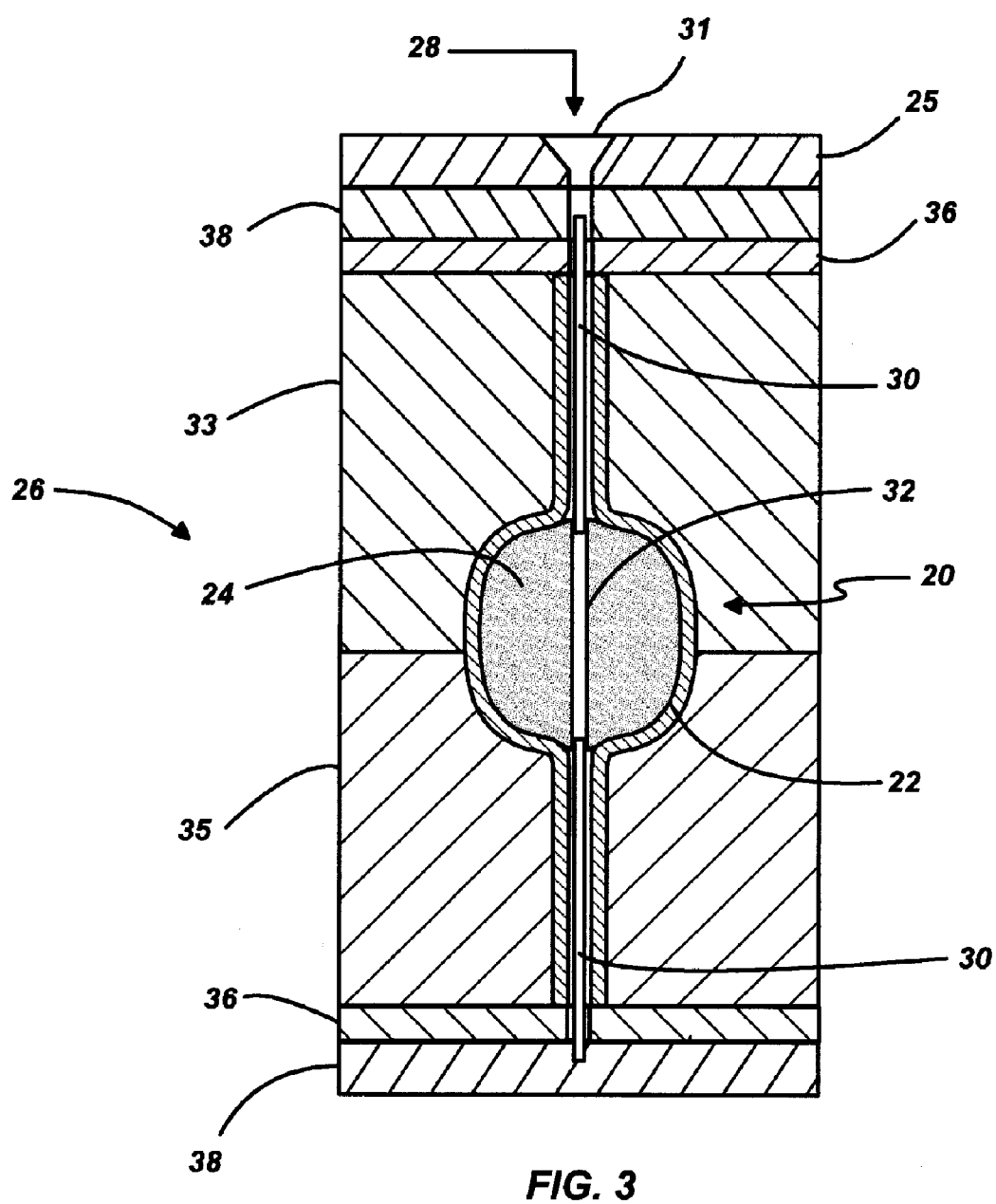
FIG. 3 is a cross sectional illustration of a molded ceramic vessel illustrating a further method and apparatus for molding the vessel using the molded core of the present invention.

With reference now to FIGS. 2 and 3, the present invention includes a novel method of molding a ceramic vessel 20 with a hollow chamber 22, a molded core 24 for making the vessel 20, and an apparatus (shown in FIG. 3) for molding the vessel 20. The molded core 24 for defining the hollow chamber 22 of the vessel 20 is a compressed, water-soluble powder that is flushed out of the vessel with water. In general, powders that are suitable for the present invention include those that are water-soluble, melt at a temperature above a temperature of an injected ceramic molding mixture that forms the vessel, and hold their shape during injection molding. More particularly, the melting point of the compressed powder should be higher than the melting point of the polymers and/or waxes used as the main ingredients of the ceramic molding mixture to avoid melting the surface of the molded core 24 during molding of the vessel.

A typical ceramic molding mixture includes an alumina powder mixed with a wax binder or other thermoplastic material. The components, and in particular the organics, in the ceramic molding mixture should not dissolve the molded core or cause pitting or roughening of the surface of the molded core. Further, the molded core should have a sufficient strength to withstand the pressures of an injection molding process so as to avoid crumbling, erosion and cracking. The removable water-soluble powder that forms the molded core 24 desirably is low cost because the powder preferably is used once and is easy to shape into the desired core geometry with a reasonable surface finish (minimal seam lines or burrs). Powders that are suitable include starch, sucrose, lactose, fructose, sorbitol, mannitol, dextrates, and polyethylene glycol wax powders.

The water-soluble powder, once compressed into a shape that defines the hollow chamber of the vessel, may have a density of 1.2 to 1.6 gm/cc and a diametrical compression strength of 1 to 6 N/mm$^2$. These values were from test tablets that were about 13 mm in diameter and 5-6 mm high that were pressed at a load of 5000 pounds. Values outside these density and strength ranges may also be acceptable provided that the compressed powder retains its shape during use and is dissolvable with water. Particle sizes of commercially available powders are generally acceptable (typically a median particle size of less than several hundred micrometers), e.g., typical commercial excipient powders used in pharmaceutical products.

Examples of suitable commercial powders that are water soluble, melt above a temperature of an injected ceramic molding mixture, and hold their shape during use include Pharma™ DC 93000 directly compressible starch, Sorbogem™ sorbitol, Sorbidex™ sorbitol, Carbowax™ 8000 polyethylene glycol wax powder, Emdex™ dextrates, DiPac™ sugar, SugarTab™ sugar, Mannogem™ mannitol, and DCL™ 11 or 15 lactose.

A lubricant or release agent may be added to the powder or the core pressing die surfaces to improve compaction and release from the die. Magnesium stearate, used in some pharmaceutical tablet pressing (0.25 to 1.0 weight percent), is suitable for the present invention when forming arc discharge vessels. Stearic acid and other similar lubricants are also acceptable. Some materials, such as sorbitol, polyethylene glycol and starch, release well without an agent, while others, such as mannitol, dextrates and sugar, do better when a release agent film of stearic acid is coated on the tools by dipping the punches in a saturated solution of stearic acid in methanol.

The time required to dissolve the compressed powder shape that forms the molded core 24 is a consideration when selecting which product to use. Longer dissolution time means that more core dissolving stations will be needed and the manufacturing time per unit will be longer. For example, a test indicated that a compressed powder molded core for a 150 watt arc discharge vessel dissolved in less than 10 minutes when the powder was Sorbogem™ sorbitol, Sorbidex™ sorbitol, or Emdex™ dextrates, while a molded core made of Carbowax™ 8000 polyethylene glycol powder took about 25 minutes to dissolve.

Another consideration is whether the dissolved molded core leaves a contaminant residue on an interior surface of the vessel or otherwise contaminates the ceramic of the vessel. In arc discharge vessels, the chemistry inside the arc discharge chamber is significant and the introduction of a contaminant may change characteristics of light emitting from the tube. A contaminant may also affect the properties of the ceramic, e.g., strength or translucency, by becoming incorporated into the ceramic when the vessel is sintered. For example, a small amount of magnesium remains on the interior surface of the vessel when magnesium stearate is used as a lubricant. However, magnesium is a frequent dopant in polycrystalline alumina discharge vessels and thus would not constitute a contaminant in such vessels. Stearic acid lubricant leaves no inorganic residue.

Powders that expand during dissolution (e.g., those that are designed for quick dissolution) or release gases (e.g., antacid powders that release $CO_2$) should be avoided as these powders may damage the molded vessel, or in the latter case, restrict water flow into the vessel while attempting to dissolve the molded core.

With reference again to FIGS. 2 and 3, a method and apparatus for molding a ceramic vessel 20 include the steps of compressing the water-soluble powder into a shape of a discharge chamber of the vessel, suspending the compressed powder shape (the molded core 24) in an exterior mold 26, injecting a ceramic molding mixture 28 into the exterior mold 26 to form the vessel 20, and dissolving the compressed powder shape (molded core 24) by preferably flushing water through the vessel 20. As shown in FIG. 2, the molded core 24 preferably has a hole 32 therethrough to facilitate dissolution of the compressed powder. The hole 32 may be formed while the molded core is in the press by using a modified press tool or die, or the hole may be formed later by drilling.

Figure 1:
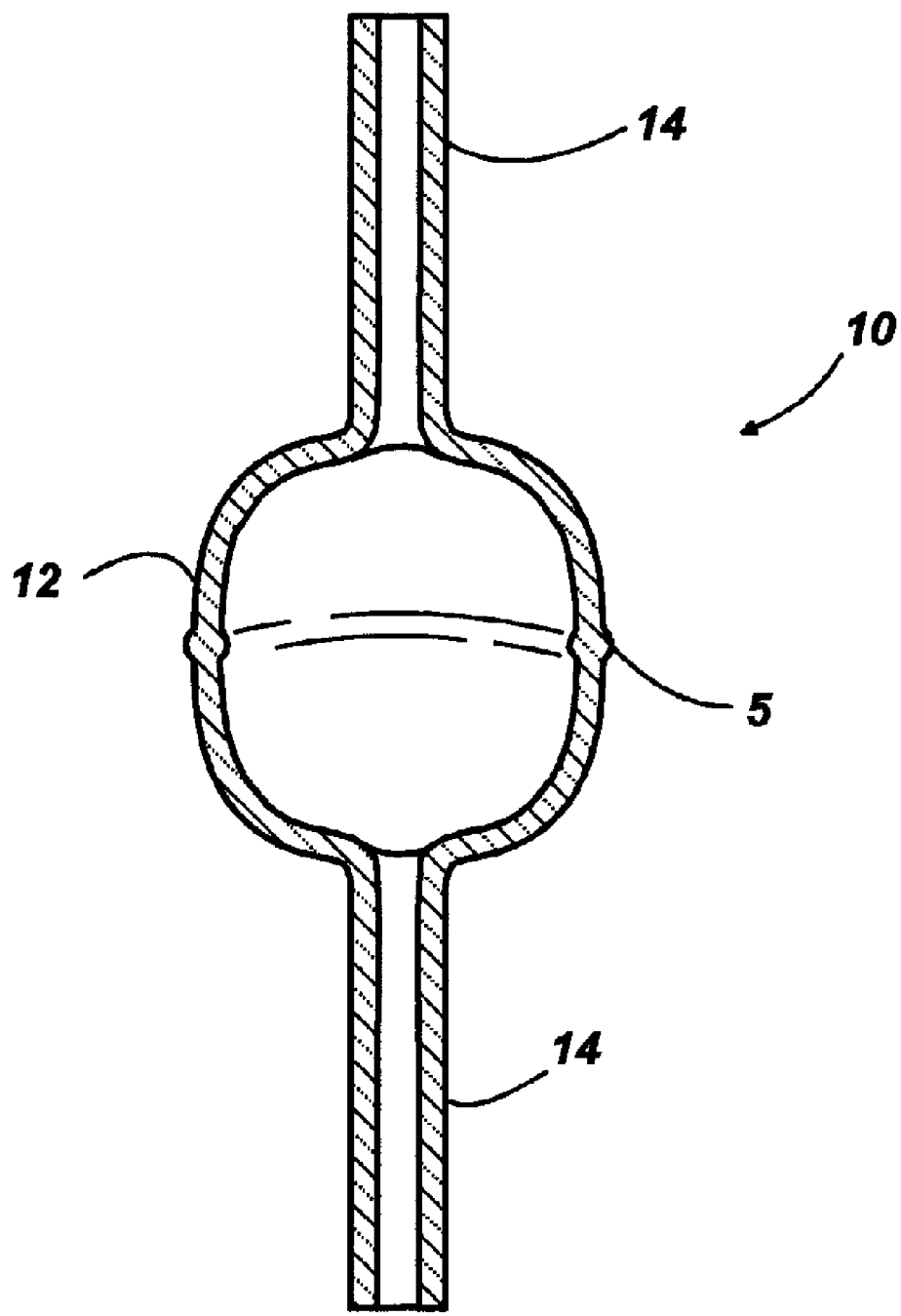
FIG. 1 is cross-sectional illustration of a ceramic vessel of the prior art.

As shown in FIG. 3, the method may also include the step of inserting pins 30 into the compressed powder shape that forms the molded core 24 to facilitate suspending the molded core 24 in the exterior mold 26. The pins 30 also may be used to define the interior diameter of capillaries that extend from the vessel (such as the capillaries 14 in FIG. 1). The pins 30 may be provided in recesses for the two pins that are opposite each other in the molded core 24. The ends of the hole 32 may form the recesses for receiving the pins 30.

Exterior mold 26 is a split tool having a main body with upper 33 and lower 35 sections to allow removal of the molded vessel. Orientation of the parting line is not critical. For example, the molding tool parting line can be oriented along the length of the vessel or around the largest diameter of the body. When the pins 30 are used to form the capillaries, removal of the pins 30 from the capillaries may be facilitated by incorporating stripping plates 36 in the mold that support the ends of the capillaries during the extraction of the pins. The stripping plates ease the tension in the capillaries during pin extraction to avoid breaking the capillaries where they blend into the body of the vessel. Pins 30 may be fixed to retracting plates 38 to facilitate pin extraction after molding. The ceramic molding mixture is injected into the mold though orifice 31 in filling plate 25.

After the molded vessel is formed, the compressed powder shape may be dissolved by removing the pins 30 and then flushing the water through the hole 32 to dissolve the compressed powder shape. The hole 32 through the compressed powder shape improves the speed at which the powder dissolves by facilitating the flushing action of the water. The diameter of the hole is not critical but is desirably large enough to permit water to flow and is desirably less than or equal to a diameter of the pins (a hole of 0.028 inches in diameter has been found to be suitable).

Figure 4:
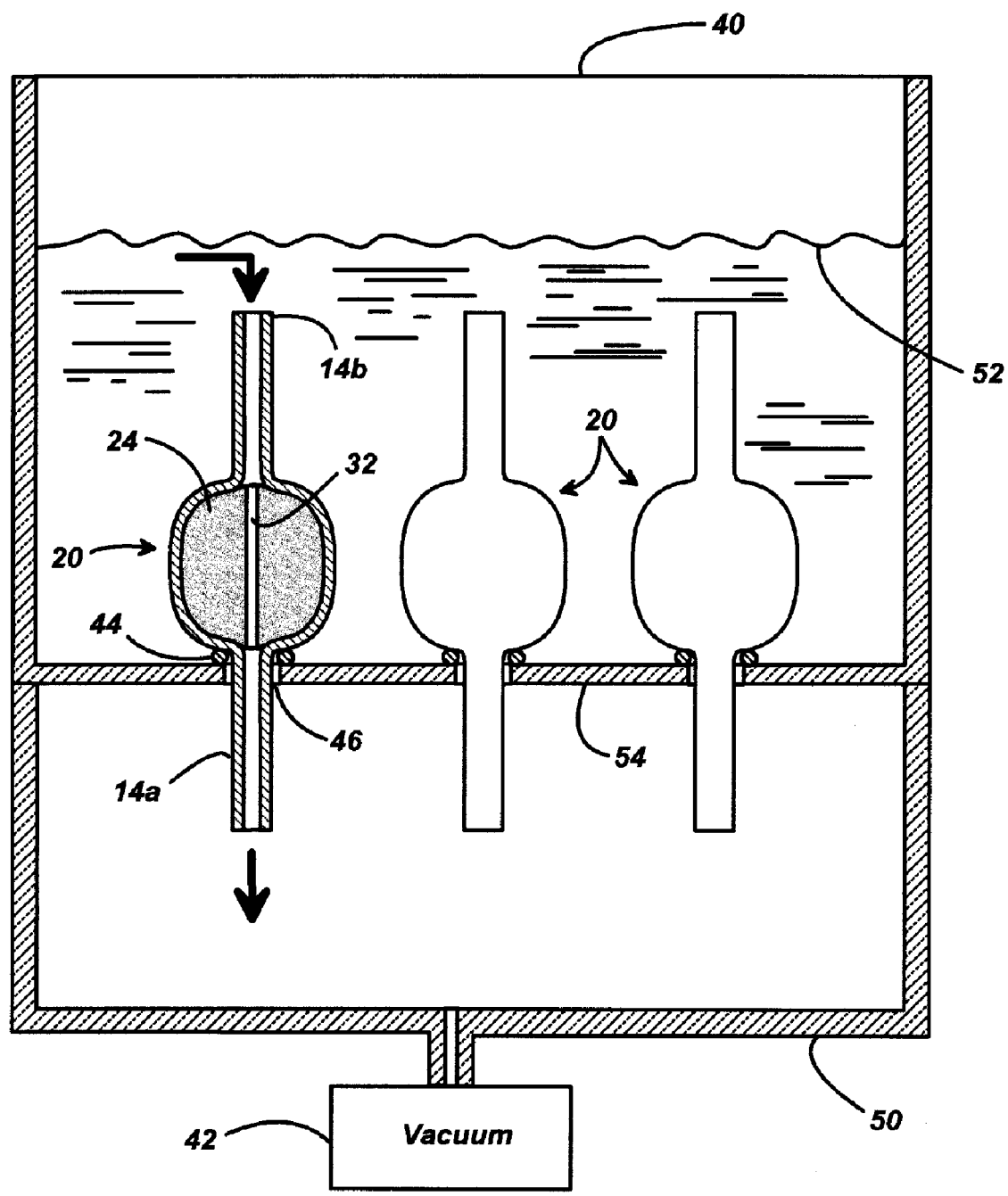
FIG. 4 is a pictorial representation of a reservoir that provides water for dissolving the molded core of the present invention.

As shown in FIG. 4, the step in which the water dissolves the molded core 24 may be accomplished in a preferred method by submerging the molded vessel 20 (leftmost vessel shown in cross section) still containing the molded core 24 in a water reservoir 40 having an opening 46 in a lower portion 54 of the reservoir 40 below the level of the water 52. In this embodiment, the molded vessel is oriented with a first capillary 14a inserted through the opening 46 and communicating outside the reservoir 40. Water in the reservoir 40 enters a second capillary 14b that is submerged in the water in the reservoir so that the water flows through hole 32 in molded core 24 and exits the first capillary 14a carrying away dissolved powder into container 50, as shown by the arrows in FIG. 4. A seal 44, e.g., an o-ring or other gasket type, may be provided at opening 46 to seal against the molded vessel 20. The reservoir 40 may be further adapted to receive plural vessels 20.

A suitable water flow rate per vessel is about 1 liter per minute. Water may be returned to the reservoir for recirculation until saturated with the dissolved powder. The water may also be heated to increase the powder removal rate, although high temperatures (e.g., over 40° C.) may adversely affect the molded vessel. In order to improve water flow through the molded vessel 20, the container 50 may be mated to the reservoir 40 and connected to a source of vacuum 42, thereby applying a vacuum to the first capillary 14a.

Other methods of dissolving and flushing the powder may be used, such as static immersion or repeated dipping of the vessel but these were not found to be as efficient as the above-described method that employs the reservoir to flush water through the hole in the molded core.

After removing the molded core from the vessel, further processing of the vessel may be conventional. For example, debinding, prefiring, and final sintering steps may be similar to those used for other ceramic vessels. Unless otherwise indicated, references herein to a ceramic discharge vessel mean the molded ceramic vessel in its green state, i.e., prior to debinding and sintering.

While embodiments of the present invention have been described in the foregoing specification and drawings, it is to be understood that the present invention is defined by the following claims when read in light of the specification and drawings.

What is claimed is:

1. A core for molding a ceramic discharge vessel having a discharge chamber, the core comprising: a molded core comprising a compressed, water-soluble powder selected from the group consisting of starch, sucrose, lactose, fructose, sorbitol, mannitol, and dextrates, said molded core having a shape of the discharge chamber.

2. The core of claim 1, wherein said molded core has a density of 1.2 to 1.6 gm/cc.

3. The core of claim 1, wherein said molded core has a diametrical compression strength of 1 to 6 N/mm$^2$.

4. The core of claim 1 wherein the molded core has a hole therethrough.

5. The core of claim 4, further comprising two capillary forming pins extending from the molded core, each pin being inserted into an end of the hole.

6. A core for molding a ceramic discharge vessel having a discharge chamber, the core comprising: a molded core of a compressed, water-soluble powder selected from the group consisting of starch, sucrose, lactose, fructose, sorbitol, mannitol, and dextrates, said molded core having a shape of the discharge chamber and having two capillary-forming pins extending therefrom.

7. The core of claim 6, wherein said molded core has a density of 1.2 to 1.6 gm/cc.

8. The core of claim 6, wherein said molded core has a diametrical compression strength of 1 to 6 N/mm$^2$.

9. The core of claim 6 wherein the molded core has a hole therethrough.

* * * * *